(12) United States Patent
Olson et al.

(10) Patent No.: US 9,934,688 B2
(45) Date of Patent: Apr. 3, 2018

(54) VEHICLE TRAJECTORY DETERMINATION

(71) Applicants: Ford Global Technologies, LLC, Dearborn, MI (US); The Regents of the University of Michigan, Ann Arbor, MI (US)

(72) Inventors: Edwin Olson, Ann Arbor, MI (US); Enric Galceran, Zurich (CH); Alexander G. Cunningham, Ann Arbor, MI (US); Ryan M. Eustice, Ann Arbor, MI (US); James Robert McBride, Saline, MI (US)

(73) Assignees: FORD GLOBAL TECHNOLOGIES, LLC, Dearborn, MI (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 19 days.

(21) Appl. No.: 14/814,766

(22) Filed: Jul. 31, 2015

(65) Prior Publication Data

US 2017/0031361 A1     Feb. 2, 2017

(51) Int. Cl.
  *G08G 1/16* (2006.01)
  *B60W 30/08* (2012.01)
  (Continued)

(52) U.S. Cl.
  CPC ............ *G08G 1/166* (2013.01); *B60W 30/08* (2013.01); *B60W 40/10* (2013.01);
  (Continued)

(58) Field of Classification Search
  None
  See application file for complete search history.

(56) References Cited

U.S. PATENT DOCUMENTS 8,457,827 B1    6/2013   Ferguson
8,788,134 B1    7/2014   Litkouhi
(Continued)

OTHER PUBLICATIONS

S Niekum, S. Osentoski, C. G. Atkeson, and A.G. Barto. CHAMP: Changepoint detection using approximate model parameters. Technical Report CMU-RI-TR-14-10, Robotics Institute, Carnegie Mellon University, 2014.*

(Continued)

*Primary Examiner* — Genna M Mott
(74) *Attorney, Agent, or Firm* — Frank A. MacKenzie; Benji Beineman PLC

(57) ABSTRACT

A system includes a computer programmed to identify, from a first vehicle, one or more second vehicles within a specified distance to the first vehicle. The computer is further programmed to receive data about operations of each of the second vehicles, including trajectory data. Based on the data, the computer is programmed to identify, for each of the second vehicles, a distribution of probabilities of each of a set of potential planned trajectories. The computer is further programmed to determine a planned trajectory for the first vehicle, based on the respective distributions of probabilities of each of the set of potential planned trajectories for each of the second vehicles. The computer is further programmed to provide an instruction to at least one controller associated with the first vehicle based on the determined planned trajectory.

20 Claims, 4 Drawing Sheets

(51) Int. Cl.
  *B60W 40/10* (2012.01)
  *G06K 9/00* (2006.01)
(52) U.S. Cl.
  CPC ......... *G06K 9/00791* (2013.01); *G08G 1/163* (2013.01); *G08G 1/167* (2013.01)

(56) References Cited

U.S. PATENT DOCUMENTS

| | | | |
|---|---|---|---|
| 8,849,557 B1* | 9/2014 | Levandowski | G08G 1/01 701/300 |
| 2010/0010699 A1 | 1/2010 | Taguchi | |
| 2011/0246156 A1 | 10/2011 | Zecha | |
| 2012/0010762 A1* | 1/2012 | Asano | G08G 1/166 701/1 |
| 2012/0143488 A1 | 6/2012 | Othmezouri | |
| 2013/0099911 A1* | 4/2013 | Mudalige | G08G 1/163 340/438 |
| 2013/0158794 A1 | 6/2013 | Wilson | |
| 2013/0261872 A1* | 10/2013 | Ferguson | G05D 1/00 701/28 |
| 2014/0358841 A1* | 12/2014 | Ono | G08G 1/0112 706/52 |

OTHER PUBLICATIONS

Gindele, Tobias; Brechtel, Sebastian; Dillman, Rudiger; A Probabilistic Model for Estimating Driver Behaviors and Vehicle Trajectories in Traffic Environments, 2010 13$^{th}$ International IEEE Annual Conference on Intelligent Transportation Systems, Madeira Island, Portugal, Sep. 19-22, 2010; Institute for Anthropomatics, Karlsruhe Institute of Technology, Germany.

* cited by examiner

VEHICLE TRAJECTORY DETERMINATION

BACKGROUND

An autonomous vehicle must evaluate consequences of potential actions by anticipating uncertain intentions of other traffic participants, e.g., vehicles. Future actions of the other traffic participants depend on planned trajectories governing their behavior which are generally unknown, and additionally depend on interactions between the participants. Simply extrapolating paths of other vehicles may not give an indication of their intentions for future actions.

DRAWINGS

Figure 1:
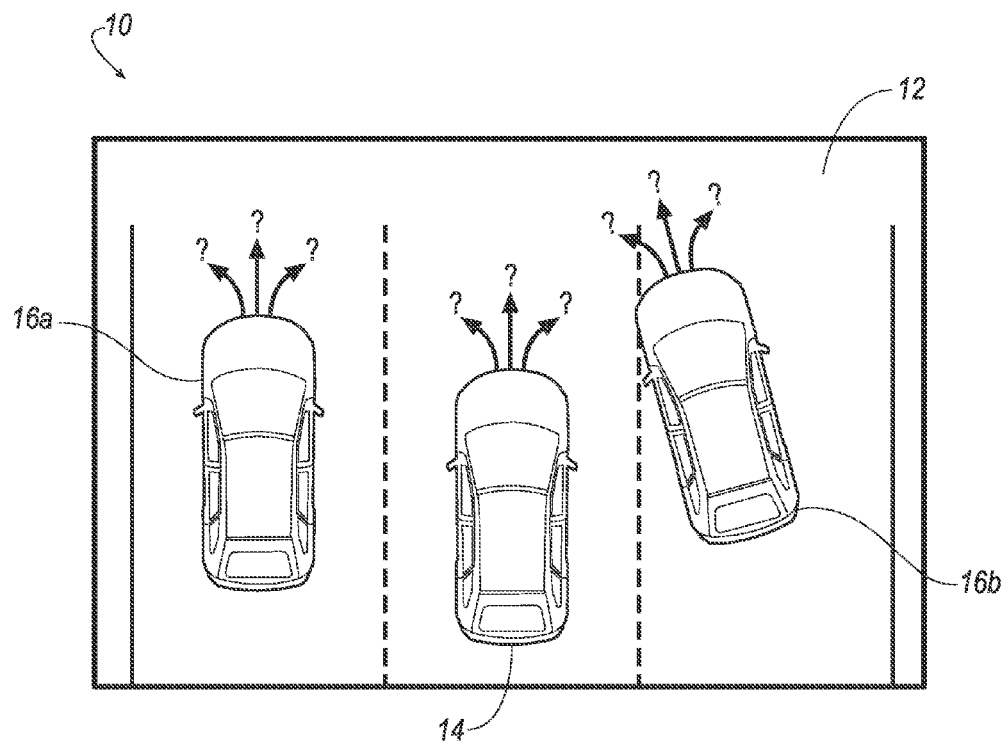
Figure 2:
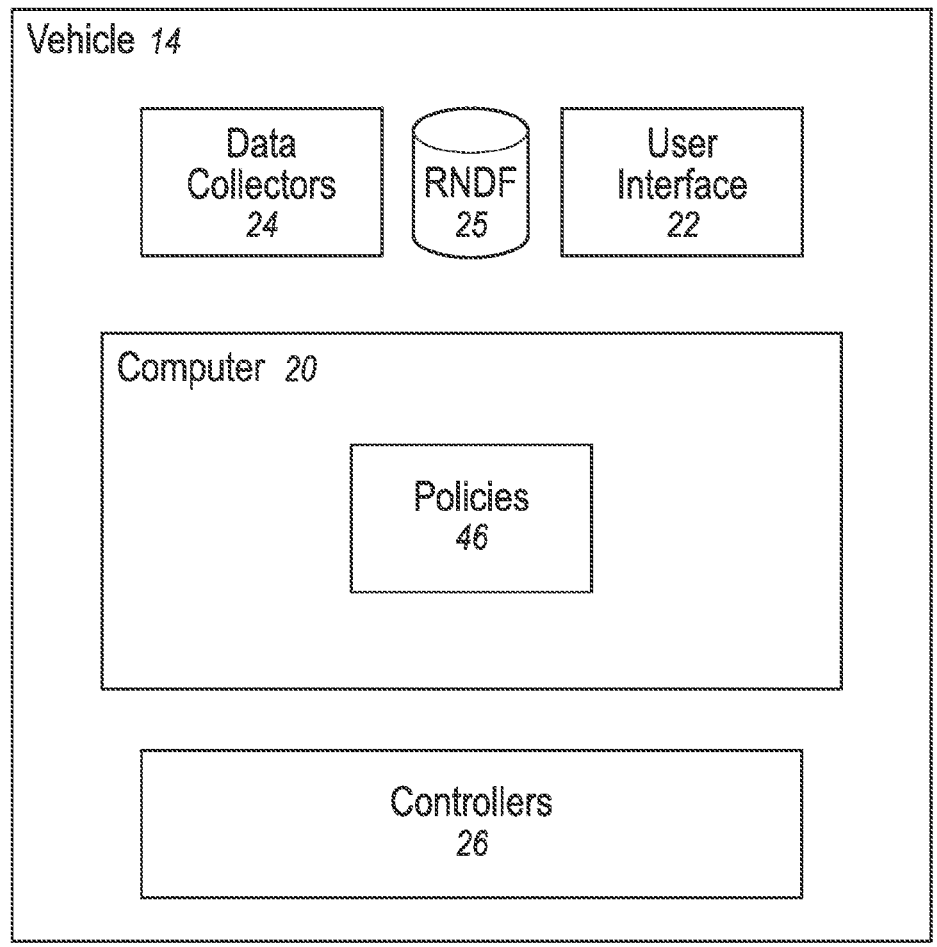
Figure 3:
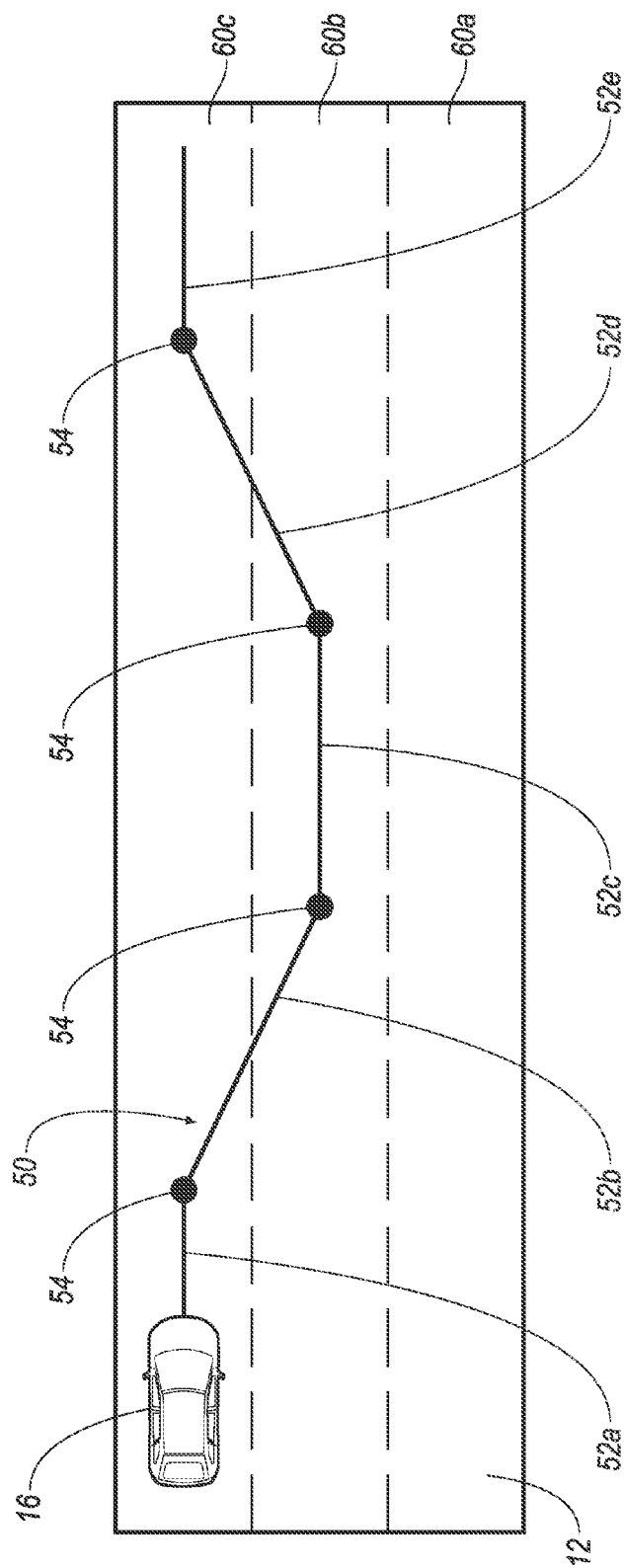
Figure 4:
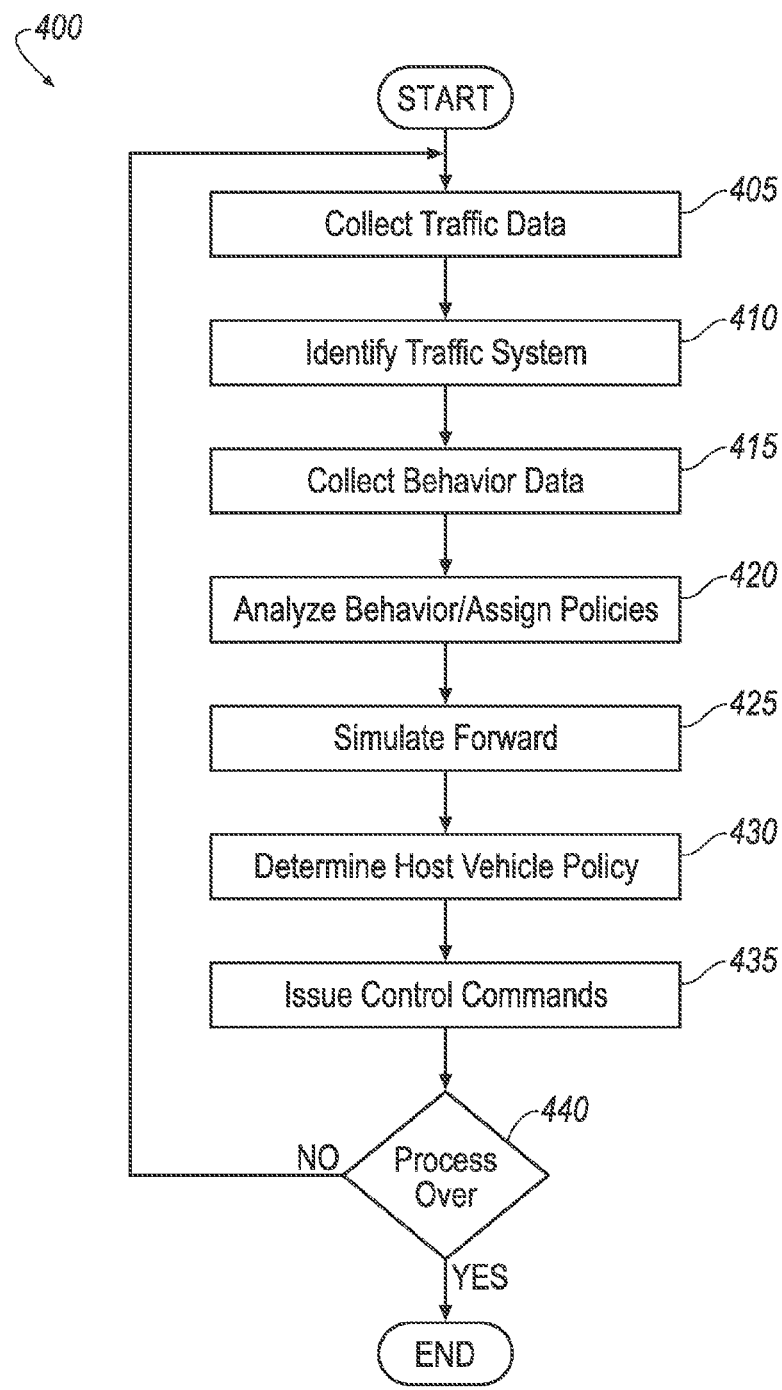

FIG. 1 is a diagram of an exemplary traffic environment.
FIG. 2 is a block diagram of an autonomous driving system including multipolicy decision-making.
FIG. 3 is a diagram illustrating segmentation of driving history of a participant in a traffic environment.
FIG. 4 is a diagram of an exemplary process for controlling a vehicle using multipolicy decision-making.

DETAILED DESCRIPTION

System Overview

A multipolicy decision-making system advantageously uses information about the trajectory of other, non-host vehicles to determine a planned trajectory for a host vehicle. The system receives data describing the recent trajectory of each of the non-host vehicles, and identifies segments within the respective trajectories that may be explained by a policy from a discrete set of pre-defined policies. As used herein, the term "policy" means a set of one or more rules to determine a trajectory of a vehicle. More specifically, "policy" represents an intention with respect to the vehicle trajectory at a moment in time. Examples of policies are provided in detail below, and include maintaining or changing lanes, emergency stop, overtaking a non-host vehicle, etc.

Based on the segmentation of the respective trajectories, the multipolicy decision-making system identifies distributions of likely policies governing future trajectories of each of the non-host vehicles. Based on these distributions, the multipolicy decision-making system further identifies one or more candidate policies to determine the trajectory of the host vehicle.

The multipolicy decision-making system then selects sample policies for each of the vehicles, forward-simulates the traffic environment over a time horizon, and compares the results with an established set of rewards. The process repeats iteratively to identify and adjust the policy to determine the trajectory of the host vehicle. Utilizing a discrete set of pre-defined policies to categorize the operation of a vehicle advantageously reduces the complexity of simulating the interaction of vehicles within the traffic environment.

Multipolicy decision-making for vehicles is founded on a generalized process for decision-making applicable to dynamic, uncertain environments that are characterized by highly interactive coupling between participants, as disclosed herein.

General Decision Process

Let V denote a set of vehicles interacting in a local neighborhood, e.g., within a predetermined distance such as 250 meters, of a host vehicle, including the host vehicle itself. At time t, a vehicle $v \in V$ can take an action $a_t^v \in A^v$ to transition from state $x_t^v \in X^v$ to $x_{t+1}^v$. In the system, a non-zero is a tuple of the pose, velocity, and acceleration, and an action $a_t^v$ is a tuple of controls for steering, throttle, brake, shifter, and directionals. Pose may include a position of a vehicle and the orientation (roll, pitch, yaw). Pose may further include one or more of velocity, acceleration and rotation rate. The shifter may include a transmission, and may include one or more states, e.g., drive, park, and reverse. Directionals may include signals indicating future intentions, e.g., turn signals. As a notational convenience, let $x_t$ include all state variables $x_t^v$ for all vehicles at time t, and similarly let $a_t \in A$ be the actions of all vehicles.

Vehicle dynamics are modeled with a conditional probability function $T(x_t, a_t, x_{t+1}) = p(x_{t+1}|x_t, a_t)$. Similarly, observation uncertainty is modeled as $Z(x_t, z_t^v) = p(z_t^v|x_t)$, where $z_t^v \in Z^v$ is the observation made by vehicle v at time t, and $z_t \in Z$ is the vector of all sensor observations made by all vehicles. In our system, an observation $z_t^v$ is a tuple including the estimated poses and velocities of nearby vehicles and a location of static obstacles. Further, we model uncertainty on the behavior of other agents with the following driver model: $D(x_t, z_t^v, a_t^v) = p(a_t^v|x_t, z_t^v)$, where $a_t^v \in A$ is a latent variable that must be inferred from sensor observations.

Our vehicle's goal is to find an optimal policy $\pi^*$ that maximizes the expected reward over a given decision horizon H (which is also sometimes referred to herein as a time horizon H), where a policy is a mapping $\pi: X \times Z^v \rightarrow A^v$ that yields an action from the current maximum a posteriori (MAP) estimate of the state and an observation:

$$\pi^* = \underset{\pi}{\operatorname{argmax}} \mathbb{E}\left[\sum_{t=t_0}^{H} \int_X R(x_t) \rho(x_t) \, dx_t \right], \qquad (1)$$

where $R(x_t)$ is a real-valued reward function $R: X \rightarrow \mathbb{R}$. The evolution of $p(x_t)$ over time is governed by $$p(x_{t+1}) = \int_X \int_Z \int_A p(x_{t+1}|x_t, a_t) p(z_t|x_t) p(a_t|x_t, z_t) p(x_t) \, da_t \, dz_t \, dx_t. \qquad (2)$$

The decision horizon H may be, e.g., a predetermined time, such as 30 seconds. Alternatively, the decision horizon H may be determined, e.g., based on a type of traffic situation, such as, approaching an intersection, driving on a highway, etc. Other factors, such as environmental factors may also be considered in determining the decision horizon H.

The driver model D $(x_t, z_t^v, a_t^v)$ implicitly assumes that instantaneous actions of each vehicle are independent of each other, because $a_t^v$ is conditioned only on $x_t$ and $z_t^v$. Instantaneous actions may be defined as actions chosen by each of the vehicles at a given timestep that are independent of knowledge of other vehicle's actions. Modeled agents can, however, still react to the observed states of nearby vehicles via $z_t^v$. That is to say, that vehicles do not collaborate with each other, as would be implied by an action $a_t^v$ dependent on $a_t$. Thus, the joint density for a single vehicle v can be written as $$p^v(x_t^v, x_{t+1}^v, z_t^v, a_t^v) = p(x_{t+1}^v|x_t^v, a_t^v) p(z_t^v|x_t^v) p(a_t^v|x_t^v, z_t^v) p(x_t^v), \qquad (3)$$

and the independence assumption finally leads to $$p(x_{t+1}) = \Pi_{v \in V} \iiint_{x^v z^v A} p^v(x_t^v, x_{t+1}^v, z_t^v, a_t^v) \, da_t^v \, dz_t^v \, dx_t^v. \qquad (4)$$

Despite assuming independent vehicle actions, marginalizing over the large state, observation and action spaces in Eq. 4 is too computationally expensive to find an optimal policy in a timely manner. A possible approximation to speed up the process is to solve Eq. 1 by drawing samples from $p(x_t)$. However, sampling over the full probability space with random walks will yield a large number of low probability samples. An approach designed to sample from high likelihood scenarios improves the usability of the decision-making process.

Multipolicy Approach

The following two key approximations are made in order to sample from-likely interactions of traffic agents:
1. At any given time, both the host vehicle and the non-host vehicles are executing a policy selected from a discrete set of policies.
2. The vehicle dynamics and observation models are approximated through deterministic, closed-loop forward-simulation of all vehicles with assigned policies. Closed-loop simulations take into account potential interactions between agents based on the assigned policies.

With these approximations, the consequences of decisions may be evaluated over a limited set of high-level behaviors determined by the available policies (for both the host vehicle and other agents), rather than performing the evaluation for every possible control input of every vehicle.

Let Π be a discrete set of policies, where each policy captures a specific high-level driving behavior including a planned trajectory. Let each policy $\pi \in \Pi$ be parameterized by a parameter vector θ capturing variations of the given policy. For example, for a lane following policy, θ can capture the "driving style" of the policy by regulating its acceleration profile to be more or less aggressive. Thus, the search in Eq. 1 may be reduced to a limited set of policies. By assuming each vehicle $v \in V$ is executing a policy $\pi_t^v \in \Pi$ at time t, the driver model for other agents can be now expressed as:

$$D(x_t^v, z_t^v, a_t^v, \pi_t^v) = p(a_t^v | x_t, z_t^v, \pi_t^v) p(\pi_t^v | x, z_{0:t}), \quad (5)$$

where $p(\pi_t^v | x_t, z_{0:t})$ is the probability that vehicle v is executing the policy $\pi_t^v$ (we describe how we infer this probability below). Thus, the per-vehicle joint density from Eq. 3 can now be approximated in terms of $\pi_t^v$:

$$p^v(x_t^v, x_{t+1}^v, z_t^v, a_t^v, \pi_t^v) = p(x_{t+1}^v | x_t^v, a_t^v) p(z_t^v | x_t^v) \\ p(a_t^v | x_t^v, z_t^v, \pi_t^v) p(\pi_t^v | x_t, z_{0:t}) p(x_t^v). \quad (6)$$

Finally, because the policy executed by the host vehicle $q \in V$ may be fully controlled, we can separate the host vehicle from the other agents in $p(x_{t+1})$ as follows:

$$p(x_{t+1}) \approx \int_{x^q} \int_{z^q} p^q(x_t^q, x_{t+1}^q, z_t^q, a_t^q, \pi_t^q) dz_t^q dx_t^q \quad (7)$$

$$\prod_{v \in V | v \neq q} \left[ \sum_\Pi \int_{x^v} \int_{z^v} p^v(x_t^v, x_{t+1}^v, z_t^v, a_t^v, \pi_t^v) dz_t^v dx_t^v \right].$$

Thus far the action space from $p(x_{t+1})$ has been factored out by assuming actions are given by the available policies. However, Eq. 7 still requires integration over the state and observation spaces. A second approximation addresses this issue. Given samples from $p(\pi_t^v | x_t, z_{0:t})$ that assign a policy to each vehicle, the interactions of both the vehicle and the non-host vehicles may be simulated forward in time under their assigned policies, obtaining the corresponding sequences of future states and observations. In this manner, the reward function over an entire decision horizon may be evaluated.

Exemplary Traffic Environment

An exemplary traffic environment 10 is illustrated in FIG. 1. The traffic environment 10 includes a highway 12, a host vehicle 14, a first non-host vehicle 16a and second non-host vehicle 16b. In the exemplary traffic environment 10, the host vehicle 14 is a vehicle programmed to use multipolicy decision-making for at least some driving decisions. Non-host vehicles 16 are vehicles other than the host vehicle 14. It is to be understood that the statement herein that a "vehicle is programmed" means that a vehicle includes a computer that is programmed as described, e.g., a computer 20 as discussed below.

The host vehicle 14 is programmed to define a traffic environment 10 which includes the host vehicle 14 and one or more non-host vehicles 16 within a predefined distance to the host vehicle 14. The predefined distance to the host vehicle 14, may be defined, e.g., as within a first fixed distance in a first specified direction, e.g., 20 meters of a left or right side of the host vehicle 14 and within a second fixed distance in a second specified direction, e.g., 100 meters of a front or rear of the host vehicle 14. The determination of "the predefined distance" may additionally or alternatively be dependent on a particular traffic situation. For example, a smaller area may be considered as within the predefined distance to the host vehicle 14 in a parking situation, and a larger area may be considered as within the predefined distance to the host vehicle 14 on a highway. Further, the predefined distance to the host vehicle 14 may be defined to depend on other conditions, e.g., a speed of the host vehicle 14, weather conditions, light conditions (day or night), etc.

The host vehicle 14 is further programmed to collect data regarding recent driving history of each of the one or more non-host vehicles 16 and to perform a change-point analysis on each of the non-host vehicle 16 driving histories. The host vehicle 14 divides the recent driving history of each of the non-host vehicles 16 into segments and identifies a distribution of likely polices 46 (FIG. 2), e.g., driving along a lane, turning at an intersection, etc. which governed the non-host vehicle 16 during each of the segments.

Based on the distribution of likely policies 46 for each of the other vehicles 16 in the traffic environment 10, the host vehicle 14 is further programmed to determine one or more policies 46 to govern its behavior. One or more closed-loop simulations of the traffic environment 10 are performed based on samples from the policy 46 distributions of the other vehicles 16 and the host vehicle 14. For example, a merging non-host vehicle 16 may accelerate, and the host vehicle 14 may slow down to make room for it. The results of the simulations are compared to a reward function, i.e., a set of desired outcomes for the traffic environment 10. Based on the results of the one or more simulations, the host vehicle 14 is further programmed to decide upon a policy 46 to govern driving behavior at a current timestep. A timestep may be defined as a period of time between consecutive updates of a policy to govern the host vehicle. The timestep for the multipolicy decision-making system may be periodic, e.g., in a range from one to four Hertz. In this manner, the host vehicle 14 may make iterative driving decisions based on coupled interactions with the non-host vehicles 16.

In some cases, the vehicle 14 may detect anomalous behavior of one or more other vehicles 16 that cannot be explained by the set of policies 46 available to the environment 10, e.g., driving the wrong direction on a highway, driving erratically, etc. In this case, a single policy, accounting for only the current state and map of the environment may be selected to model the non-host vehicle 16 exhibiting the anomalous behavior.

Policies may include provisions to account for interacting with vehicles exhibiting anomalous behavior. For example, a lane-nominal policy governing the host vehicle 14 may provide for following at a greater distance if a non-host vehicle 16 in front of the host vehicle 14 is flagged as anomalous.

Further, in some cases, multipolicy decision-making may be suspended when a non-host vehicle 16 exhibiting anomalous behavior is detected, and an alternate form of driving decision-making, may be employed.

Exemplary System Elements

An exemplary host vehicle 14 programmed to use multipolicy decision-making to make driving decisions is shown in FIG. 2. The host vehicle includes a computer 20, a user interface 22, one or more data collectors 24, a road network definition file (RNFD) 25, and one or more controllers 26. The host vehicle 14 is generally a land-based vehicle having three or more wheels, e.g., a passenger vehicle, light truck, etc. The host vehicle 14 has a front, a rear, a left side and a right side, wherein the terms front, rear, left and right are understood from the perspective of an operator of the host vehicle 14 seated in a driver's seat in a standard operating position, i.e., facing a steering wheel.

The computer 20 generally includes a processor and a memory, the memory including one or more forms of computer-readable media, and storing instructions executable by the processor for performing various operations, including as disclosed herein. Further, the computer 20 may include and/or be communicatively coupled to one or more other computing devices included in the host vehicle 14 for monitoring and/or controlling various vehicle components. The computer 20 is generally programmed and arranged for communications on a controller area network (CAN) bus or the like.

The computer 20 may also have a connection to an onboard diagnostics connector (OBD-II), a CAN (Controller Area Network) bus, and/or other wired or wireless mechanisms. Via one or more such communications mechanisms, the computer 20 may transmit messages to various devices in a vehicle and/or receive messages from the various devices, e.g., controllers, actuators, sensors, etc., including data collectors 24 and controllers 26. Alternatively or additionally, in cases where the computer 20 actually comprises multiple devices, the CAN bus or the like may be used for communications between devices represented as the computer 20 in this disclosure. In addition, the computer 20 may be configured for communicating with other devices via various wired and/or wireless networking technologies, e.g., cellular, Bluetooth, a universal serial bus (USB), wired and/or wireless packet networks, etc.

A memory of the computer 20 generally stores collected data. Collected data may include a variety of data collected in a host vehicle 14 by data collectors 24 and/or derived therefrom. Examples of collected data 24 may include, e.g., data about the driving history of one or more non-host vehicles 16, e.g., the position (for example, geo-coordinates, a distance from the host vehicle 14, etc.) of the non-host vehicle 16 as a function of time, the speed of the non-host vehicle 16 as a function of time, the direction of travel, the number and magnitude of changes in direction and speed at various time points, etc. Collected data may further include, e.g., information such as a type (e.g., light truck, passenger car, minivan, etc.), dimensions, make, model, etc. of the one or more of the non-host vehicles 16. The collected data may additionally include data calculated from data received form data collectors 24 in the computer 20. In general, the collected data may include any data that may be gathered by the data collectors 24, received through vehicle-to-vehicle (V2V) or vehicle-to-infrastructure (V2I) communications, collected or received from other sources, and/or computed from such data.

The computer 20 may be programmed to receive data from the data collectors 24 and data related to the goals, e.g., destination, route, time of arrival, etc. of the host vehicle 14. Based on the collected data, as described below, the computer 20 may define a traffic environment 10, identify non-host vehicles 16 participating in the traffic environment 10, and determine a policy 46 for the host vehicle 14.

The computer 20 may further be programmed to collect data regarding the goals of the host vehicle 14 and other data related to the host vehicle 14, e.g., maps of an area where the vehicle 14 is operating. For example, the computer 20 may receive input from the user via the user interface 22 indicating the destination of the user, the route the user would like to take, the driving style (conservative, sporty), etc. The computer 20 may further include or receive, e.g., maps of the area, e.g., from a GPS system or from memory. Based on the received data, the computer 20 may perform what is referred to as "mission planning," i.e., planning a path to a desired destination in terms of driving directions on a road network map. The computer 20 may further be programmed to store this data in a memory for further use, e.g., for use in determining a driving policy 46 and/or in driving the host vehicle 14.

Based on a policy 46 and mission planning data, the computer 20 may determine and send commands to vehicle controllers 26 to control the vehicle 14 according to the policy 46 and planned mission.

Generally, each controller 26 may include a processor programmed to receive instructions from the computer 20, execute the instructions, and send messages to the computer 20. An electronic control unit (ECU), such as is known, and moreover having programming for operating as described herein, is an example of a controller 26. Further, each of the controllers 26 may include or be communicatively coupled to an actuator or the like that is provided to actuate a vehicle component, e.g., brakes, steering, throttle, etc. For example, a brake controller 26 may include a processor and a pump for adjusting a pressure of brake fluid. In this example, upon receiving an instruction from the computer 20, the processor may activate the pump in order to provide power assist or initiate a braking operation.

Further, the controllers 26 may each include sensors or otherwise operate as data collectors 24 to provide data to the computer 20 regarding vehicle speed, vehicle steering angle, height of a suspension, etc. For example, the brake control unit 26 may send data to the computer 20 corresponding to the brake pressure being applied by the brake controller 26.

Data collectors 24 may include a variety of devices. For example, data collectors 24 may include lidar, radar, video cameras, ultrasonic sensors, infrared sensors for sensing the environment, and for example, tracking non-host vehicles 16. Data collectors 24 may further include components that collect dynamic host vehicle 14 data, such as velocity, yaw rate, steering angle, etc. Further, the foregoing examples are not intended to be limiting. Other types of data collectors 24, for example accelerometers, gyroscopes, pressure sensors, thermometers, barometers, altimeters, etc., could be used to provide data to the computer 20.

A road network definition file (RNDF) 25 may include encoded topological-metric maps of the road networks where the host vehicle 14 may be operating. The topological-metric maps include latitude and longitude coordinates for road features and other objects in the environment and are encoded based on a derivative of the RNFD file format. The RNDF 25 may supply map data, e.g., to the computer 20.

The host vehicle 14 may further include a user interface 22 that may be included in or communicatively coupled to the computer 20. The user interface 22 can be used to allow a user to monitor a policy 46 selection procedure and/or to manually select policies 46 to execute. The interface 22 may include one or more output devices such as a display, speakers, etc. for communicating information to a user. The interface 22 may further include one or more input devices such as a touch screen display, a keyboard, a gesture recognition device, switches, etc., for receiving input from the user.

The computer 20 may be programmed to store data related to the non-host vehicles 16. As described above, this data may include data representing a history of data points, e.g., the pose of the non-host vehicle 16 as a function of time, a speed of the non-host vehicle 16 as a function of time, a direction of travel, a number and magnitude of changes in direction and speed at various time points, etc. The history may be sampled periodically, e.g., every 0.3 s, with a maximum allowed number of history points. The maximum allowed number of history points may be, e.g., 400, which may show the previous two minutes of driving behavior for each non-host vehicle 16. The maximum allowed number of history points may depend on the type of driving situation currently being considered. For example, fewer history points may be necessary for a parking maneuver than for driving on a highway.

Collected data related to the non-host vehicles may further include, e.g., information about each of the non-host vehicles 16 such as the type, dimensions, make, model, etc. The collected data may additionally include data calculated therefrom in the computer 20.

The computer 20 maintains and publishes cost maps that indicate obstacles in the environment that the host vehicle 14 should avoid. The costmaps further indicate "virtual" obstacles, i.e., areas that the host vehicle 14 should not drive in, such as lanes of oncoming traffic. The computer 20 generates costmaps of these obstacles and virtual obstacles and stores the costmaps. The costmaps may be used, e.g., to select a policy 46 to govern the host vehicle 14. The costmaps may be used to determine actions to be taken by the host vehicle 46 to implement a policy 46. The costmaps may further be used to determine actions to be taken by the host vehicle 14, independent of a policy 46, e.g., to implement obstacle avoidance maneuvers.

The computer 20 memory further generally stores policies 46. Each policy 46 is designed to capture a different high-level behavior and intention, and may include a planned trajectory. Example policies may include following a lane, changing a lane, or turning at an intersection. The policies 46 may indicate one or more actions that a vehicle 14, 16 may take in support of the policy. For example, for a lane-nominal policy (see below), the vehicle 14, 16 may take actions to steer the vehicle toward a centerline of a current lane where the vehicle 14 is travelling. The policies 46 may further indicate one or more reactions that a vehicle 14, 16 may have to another vehicle 14, 16. For example, the vehicle 14, 16 may adjust a speed of the vehicle 14, 16 to maintain desired distances between other vehicles 14, 16 in front of and/or behind the vehicle 14, 16 in the same lane. A non-limiting list of policies 46 includes:

lane-nominal: standard policy 46 that stays in a given lane and can make simple turns (such as taking off-ramps). A large portion of driving consists of this behavior. The behavior tracks the centerline of the lanes. This policy 46 is applicable if the host vehicle 14 is already relatively close to the lane centerline.

lane-change: the vehicle 14 makes a standard highway lane change in either direction, such that it transitions from one lane centerline to another. The policy 46 switches back to lane nominal once the lane change has completed. The policy 46 is applicable if traffic rules allow for a lane change and there are no obstructing non-host vehicles 16. It can also end in an abort behavior, in which after starting the lane change, we go back to the original lane—this abort occurs when a previously unobserved non-host vehicle 16 approaches the area into which the host vehicle 14 is trying to pass.

return-to-lane: this policy 46 is designed to take the host vehicle 14 from a position that is not on the center of the lane and create a safe path back to the lane center so that lane-nominal can take over.

parking: this policy 46 executes a parking maneuver within a parking lot (denoted as "zones" in our representation). This policy 46 can be used to execute forward and reverse parking maneuvers.

thru-zone: this policy 46 traverses a zone to one of its exits and then switches over to lane-nominal once reaching a lane. This is the policy 46 that would be used to exit a parking spot.

emergency-stop: this policy 46 handles forcing the host vehicle 14 to a safe stop, particularly if other policies 46 lead to bad outcomes.

lane-change-zipper: this policy 46 is similar to the standard lane-change policy 46, but executes a zipper merge in which there is a gap between two non-host vehicles 16.

intersection: this policy 46 manages behavior at intersections, such as stop and yield sign or traffic light behavior. This policy 46 can have different variations for differing levels of aggressiveness to allow the decision process to choose when to pull into an intersection.

overtake: This policy 46 allows for overtaking a single non-host vehicle 16, possibly including driving into the oncoming traffic lane, as lane markings allow. In this case, the host vehicle 14 pulls into the passing lane, accelerates ahead of the non-host vehicle 16, and then pulls back into the original lane and returns to lane nominal.

precision drive: This policy 46 is a variation on lane-nominal for use when there are obstacles blocking the path, as would happen with construction or larger road obstructions. In this case, the behavior uses a local path planner to find a route around the obstructions, with the goal of reaching the reference lane in the future. This behavior drives more slowly and precisely than lane-nominal, and should only become active when lane-nominal gets stuck.

The above list of example policies 46 is non-limiting. Different policies 46 may be used depending on a particular driving situation, on applicable traffic regulations, on cultural norms in the country where the host vehicle 14 is being driven, on weather conditions, etc.

Processes

Identifying the Non-Host Vehicles

As discussed above, the computer 20 may be programmed to identify a traffic environment 10 including a host vehicle 14 and one or more non-host vehicles 16 within a predefined distance to the host vehicle 14. As discussed above, "within a predefined distance" may be defined, e.g., as within a first fixed distance on a left and right side, e.g., 20 meters, and a second fixed distance on a front and rear side, e.g., 100 meters. Additionally or alternatively, the predefined distance may be defined as a function of a driving situation. For example, within a predefined distance may be defined as within a relatively small area if the host vehicle 14 is parking, and within a relatively large area if the host vehicle 14 is travelling on a highway. Further, the predefined distance may be defined, e.g., based on a speed that the host vehicle 14 is travelling, the policy 46 the vehicle 14 is currently executing, etc.

The computer 20 may further receive map data describing the area where the host vehicle 14 is currently driving. The computer 20 may identify the traffic environment 10 as including the map data, the host vehicle 14, and the one or more non-host vehicles 16. The traffic environment 10 may further include, for example, objects located within the driving area of the host vehicle 14, weather conditions, traffic lights, etc. which may influence the behavior of the host vehicle 14 and non-host vehicles 16.

After identifying the participants (host vehicle 14 and non-host vehicles 16) in the traffic environment 10, the computer 20 may analyze the behavior of each of the non-host vehicle 16 in the traffic environment 10, and predict the future behavior, as described below.

Behavioral Analysis and Prediction Via Change-Point Detection

After identifying the one or more non-host vehicles 16 in the traffic environment 10, the computer 20 may be programmed to collect data regarding the driving behavior of the non-host vehicles 16 during a preceding time period. The preceding time period, may be, e.g., a predetermined period of time, for example two minutes, prior to a current time. The data collected for each of the non-host vehicles 16 may include, e.g., the pose as a function of time, speed as a function of time, etc., as described above. The data may also include information about the non-host vehicle 16 such as the type, model, size, etc. Still further, the data may include information such as the number, identity etc. of the occupants of the non-host vehicle 16.

The computer 20 may be programmed, based on the collected data, to analyze the driving behavior of the one or more non-host vehicles 16 during the preceding time period. As shown in FIG. 3, a non-host vehicle 16 may travel along a path 50 on a highway 12 including first, second and third lanes 60a, 60b, 60c. The computer 20 may identify one or more segments 52 along the path 50. Change-points 54 may be identified by the computer 20 that mark a transition from one segment 52 to another segment 52.

Each segment 52 may be associated with a policy 46 which is a good fit to the observed behavior during the segment 52. According to the exemplary path 50 shown in FIG. 3, a first segment 52a, third segment 52c and fifth segment 52e may be associated with the policy 46 lane_nominal. A second segment 52b may be associated with the policy 46 lane_change_right and a fourth segment 52d may be associated with the policy 46 lane_change_left. Change-points 54 may be identified, marking a time (and position along the path 50) where a change in the underlying policy 46 governing the non-host vehicle 16 behavior is likely to have occurred.

Based on the change-points 54, the identified segments 52 and likely policies 46 associated with each of the segments 52, the computer 20 may be programmed to compute the likelihood of all available policies 46 for the target vehicle given the observations in the most recent segment, capturing the distribution $p(\pi_t^v|x_t,z_{0:t})$ over the vehicle's potential policies 46 at the current timestep. Further, based on the full history segmentation, the computer 20 may be programmed to detect anomalous behavior that is not explained by the available set of policies 46.

Changepoint Detection

A known algorithm referred to as change-point detection using approximate parameters (CHAMP), discussed below, may be used to segment a history of observed states of a target non-host vehicle 16.

Given a set of available policies 46 Π and a time series of the observed states of a given vehicle $z_1:n = (z_1, z_2, \ldots, z_n)$, CHAMP infers the maximum a posteriori (MAP) set of times $\tau_1, \tau_2, \ldots, \tau_m$, at which changepoints 54 between policies have occurred, yielding m +1 segments 52. Thus, the $i^{th}$ segment 52 consists of observations $$z_{\tau_i+1:\tau_{i+1}}$$

and has an associated policy 46 $\pi_i \in \Pi$ with parameters $\theta_i$.

The changepoints 54 are modeled as a Markov chain where the transition probabilities are a function of the time since the last changepoint 52:

$$p(\tau_{i+1}=t|\tau_i=S)=g(t-s), \quad (8)$$

where g(•) is a probability density function (pdf) over time, and G(•) denotes its cumulative distribution function (cdf).

Given a segment 52 from time s to t and a policy 46 π, CHAMP approximates the logarithm of the policy evidence for that segment 52 via a Bayesian information criterion (BIC) as:

$$\log L(s,t,\pi) \approx \log p(z_{s+1:t}|\pi\hat{\theta}) - \frac{1}{2}k_\pi \log(t-s), \quad (9)$$

where $k_\pi$ is the number of parameters of policy 46 π and $\hat{\theta}$ are estimated parameters for policy 46 π. The BIC is a known approximation that avoids marginalizing over the policy parameters and provides a principled penalty against complex policies 46 by assuming a Gaussian posterior around the estimated parameters $\hat{\theta}$. Thus, only the ability to fit policies 46 to the observed data is required, which can be achieved via a maximum likelihood estimation (MLE) method of choice.

The distribution $C_t$ over the position of the first changepoint 54 before time t can be estimated efficiently using standard Bayesian filtering and an online Viterbi algorithm. Defining $$P_t(j,q)=p(C_t=j,q,\epsilon_j,z_{1:t}) \quad (10)$$

$$P_t^{MAP}=p(\text{Changepoint at } t, \epsilon_t, z_{1:t}) \quad (11)$$

where $\epsilon_j$ is the event that the MAP choice of changepoints 54 has occurred prior to a given changepoint 54 at time j, results in:

$$P_t(j, q) = (1 - G(t-j-1))L(j, t, q)p(q)P_j^{MAP} \quad (12)$$

$$P_t^{MAP} = \max_{j,q}\left[\frac{g(t-j)}{1-G(t-j-1)}P_t(j, q)\right], \quad (13)$$

At any time, the most likely sequence of latent policies 46 (called the Viterbi path) that results in the sequence of observations can be recovered by finding (j,q) that maximize $P_t^{MAP}$, and then repeating the maximization for $P_j^{MAP}$, successively until time zero is reached.

Behavioral Prediction

As described below, the computer 20 may further be programmed to compute the likelihood of each latent policy 46 by leveraging change-point detection on the history of observed vehicle states.

Consider the $(m+1)^{th}$ segment (the most recent), obtained via change-point 52 detection and consisting of observations $z_{\tau_{m+1:n}}$. The likelihood and parameters of each latent policy 46 $\pi \in \Pi$ for the non-host vehicle 16 given the present segment 52 can be computed by solving the following maximum likelihood estimation (MLE) problem:

$$\forall \pi \in \Pi, L(\pi) = \frac{\operatorname{argmax} \log p(z_{\tau_{m+1:n}} | \pi, \theta)}{\theta} \quad (14)$$

Specifically, we assume $p(z_{\tau_{m+1:n}}|\pi,\theta)$ to be a multivariate Gaussian with mean at the trajectory $\psi^{\pi,\theta}$ obtained by simulating forward in time the execution of policy 46 $\pi$ under parameters $\theta$ from timestep $\tau_m+1$:

$$p(z_{\tau_{m+1:n}}|\pi,\theta) = \mathcal{N}(z_{\tau_{m+1:n}}; \psi^{\pi,\theta}, \sigma I) \quad (15)$$

where $\sigma$ is a nuisance parameter capturing modeling error and I is a suitable identity. That is, Eq. 15 essentially measures the deviation of the observed states from those prescribed by the given policy 46. The policy likelihoods obtained via Eq. 14 capture the probability distribution over the possible policies 46 that the observed non-host vehicle 16 might be executing at the current timestep, which can be represented, using delta functions, as a mixture distribution:

$$p(\pi_t^v | x_t, z_{0:t}) = \eta \sum_{i=1}^{|\Pi|} \delta(\alpha_i) \cdot L(\pi_i). \quad (16)$$

where $\alpha_i$ is the hypothesis over policy 46 $\pi_i$ and $\eta$ is a normalizing constant. Therefore, an approximated posterior of Eq. 7 may be computed by sampling from this distribution for each non-host vehicle 16, obtaining high-likelihood samples from the coupled interactions.

Anomaly Detection

Anomalous behavior of a non-host vehicle 16 not modeled by available policies 46 may be detected based on the time-series segmentation obtained via change-point detection. The properties of anomalous behavior may be defined in terms of policy likelihoods. The observed data may then be compared against labeled normal patterns in previously-recorded vehicle trajectories. The following two criteria may be defined for anomalous behavior:

1. Unlikelihood against available policies 46. Anomalous behavior is not likely to be explained by any of the available policies 46, since they are designed to abide by traffic rules and provide a smooth riding experience. Therefore, behaviors like driving in the wrong direction or crossing a solid line on the highway will not be captured by the available policies 46. We thus measure the average likelihood among all segments 52 in the vehicle's history as the global similarity of the observed history to all available policies 46:

$$S = \frac{1}{m+1} \sum_{i=1}^{m+1} L(\pi_i), \quad (17)$$

where $\pi_i$ is the policy 46 associated with the $i^{th}$ segment 52.

2. Ambiguity among policies 46. A history segmentation that fluctuates frequently among different policies 46 might be a sign of ambiguity on the segmentation. To express this criterion formally, we first construct a histogram capturing the occurrences of each policy 46 in the vehicle's segmented history. A histogram with a broad spread indicates frequent fluctuation, whereas one with a single mode is more likely to correspond to normal behavior. We measure this characteristic as the excess kurtosis of the histogram, $$\kappa = \frac{\mu_4}{\sigma^4} - 3$$

where $\mu_4$ is the fourth moment of the mean and $\sigma$ is the standard deviation. The excess kurtosis satisfies $-2<\kappa<\infty$. If $\kappa=0$, the histogram resembles a normal distribution, whereas if $\kappa<0$, the histogram presents a broader spread. That is, we seek to identify change-point sequences where there is no dominant policy 46.

Using these criteria, we define the following normality measure given a vehicle's MAP choice of change-points 54:

$$N = \frac{1}{2}[(\kappa+2)S]. \quad (18)$$

This normality measure on the target vehicle's history can then be compared to that of a set of previously recorded trajectories of other non-host vehicles 16. We thus define the normality test for the current vehicle's history as $N<0.5\gamma$, where $\gamma$ is the minimum normality measure evaluated on the prior time-series.

Multipolicy Decision-Making

Based on the general decision process, the approximations with regard to the multiprocess approach, and the behavior prediction process discussed above, a process may be developed and implemented for selecting a policy 46 to govern the behavior of the host vehicle 14 at the current timestep.

The process begins by drawing a set of samples $s \in S$ from the distribution over policies 46 of the non-host vehicles 16 via Eq. 16, where each sample assigns a policy 46 $\pi^v \in \Pi$ to each nearby non-host vehicle 16 $v$. For each policy 46 $\pi$ available to the host vehicle 14 and for each sample s, the computer 20 rolls out forward in time until a decision horizon H the host and non-host vehicles 14, 16 under the policy assignments $(\pi,s)$ with closed-loop simulation to yield a set $\Psi$ of simulated trajectories $\psi$. A reward $r_{\pi,s}$ for is evaluated for each rollout $\Psi$, and finally a policy 46 $\pi^*$ is selected to maximize the expected reward. The process continuously repeats in a receding horizon manner. Note that policies 46 that are not applicable given the current state $x_0$, such as an intersection handling policy 46 when driving on the highway, are not considered for selection. An exemplary process for selecting a policy 46 to govern the host vehicle 14 is presented in more detail in the section "Exemplary Process Flow", below.

Policies

As described above, each policy 46 is designed to capture a different high-level behavior and intention, and may include a planned trajectory. Policies 46 may include, e.g., following a lane, changing a lane, or turning at an intersection. Policies 46 available for a particular host vehicle 14 and/or non-host vehicle 16 may depend on the setting for the traffic environment 10, i.e., on a highway, at an intersection, in a parking lot, etc.

Sample Rollout Via Forward Simulation

While it is possible to perform high-fidelity simulations for rolling out sampled policy 46 assignments, a lower-fidelity simulation can capture the necessary interactions between vehicles 14, 16 to make reasonable choices for host vehicle 14 behavior while providing faster performance. In practice, a simplified simulation model for each vehicle 14, 16 is used that assumes an idealized steering controller. Nonetheless, this simplification still faithfully describes the high-level behavior of the between-vehicle 14, 16 interactions. Vehicles 14, 16 classified as anomalous, may be simulated using a single policy 46 accounting only for their current state and map of the environment, because they are not likely to be modeled by the set of behaviors in our system.

Reward Function

The reward function for evaluating the outcome of a rollout $\Psi$ involving all non-host and host vehicles 14, 16 is a weighted combination of metrics $m_q(\cdot) \in M$, with weights $w_q$ that express user importance. Typical metrics include the (remaining) distance to the goal at the end of the evaluation horizon to evaluate progress made toward the destination, minimum distance to obstacles to evaluate safety, a lane choice bias to add a preference for the right lane, and the maximum yaw rate and longitudinal jerk to measure passenger comfort. For a full policy 46 assignment $(\pi,s)$ with rollout $\Psi^{\pi,s}$, we compute the rollout reward $r_{\pi,s}$ as the weighted sum $r_{\pi,s} = \Sigma_{q=1}^{|M|} w_q m_q(\Psi^{\pi,s})$. Each $m_q(\Psi_{\pi,s})$ is normalized across all rollouts to ensure comparability between metrics. To avoid biasing decisions, a weight $w_q$ may be set to zero when the range of $m_q(\cdot)$ across all samples is too small to be informative.

Each policy 46 reward $r_\pi$ for the host vehicle 14 is evaluated as the expected reward over all rollout rewards $r_{\pi,s}$, computed as $r_\pi = \Sigma_{k=1}^{|S|} r_{\pi,s_k} p(s_k)$, where $p(s_k)$ is the joint probability of the policy 46 assignments in sample $s_k$, computed as a product of the per-vehicle assignment probabilities (Eq. 16). The expected reward is used to target better average-case performance, as it is easy to become overly conservative when negotiating traffic if one only accounts for worst-case behavior. By weighting by the probability of each sample, we can avoid overcorrecting for low-probability events.

A non-limiting list of metrics which may considered for a sample rollout (forward simulation) includes:

- cost-map integral: Given a cost map of obstacles in the environment (both directly observed and "virtual obstacles" denoting areas the host vehicle 14 should avoid, such as oncoming traffic), the cost for this metric is the line integral through the cost map. This cost gets larger as the host vehicle 14 get closer to obstacles, and minimizing it should improve safety. For example, the cost-map integral for a simulated result may be higher for a situation where the vehicle is travelling closer to opposing traffic, e.g., too far to the left in a left lane, and lower when the vehicle is farther away from opposing traffic, e.g., more centered in the lane.
- distance closer to goal: This metric computes a distance to goal at both the start and end of the host vehicle's simulated rollout (d_start and d_end, respectively), where the final metric is d_end−d_start. This measures progress toward the destination, where a policy maximizing this metric gets the host vehicle 14 closer to the goal. The distance closer to the goal may be measured, e.g., in kilometers. The simulation results may be normalized over the range of results from multiple simulations of a scenario.
- cross-track error: This metric is an error function for lane-following, and is the lateral distance to the lane centerline. The cost for the entire rollout can be expressed using the maximum or average error during the simulation horizon to adjust sensitivity to momentarily large deviations (e.g., when executing a lane change). Cross-track error may be measured, e.g., in meters, and normalized over the range of results from multiple simulations of a scenario.
- yaw-rate: This metric is simply the yaw rate of the host vehicle 14, either formulated as the maximum or average over the simulation interval, where minimizing this cost drives smoother, straighter trajectories that are likely to be more comfortable. Yaw rate may be measured in units of radians per second, and normalized over a range of results from multiple simulations of a scenario.
- longitudinal jerk: This metric measures jerk in longitudinal control (braking, throttle) and can be either an average or a maximum over the simulation period. This is primarily a driver-comfort metric. Longitudinal jerk may be measured in units of meters/(second)$^2$ and may be normalized over a range of results from multiple simulations of a scenario.
- goal-based lane bias: Attaches a cost to the host vehicle 14 being in a particular lane, where the cost increases if the host vehicle 14 is in a lane that is on a less direct path to the goal (e.g., far left lanes on a highway before making a turn). This cost function accumulates cost for each timestep spent in a lane, so that being in a bad lane and choosing to make a lane change costs less than simply staying the lane. Goal-based lane bias may be measured in units of lane-seconds, and may reflect how many lanes the host-vehicle 14 is from a lane directly on a path to the goal, and how long the host vehicle 14 is in a lane other than the lane directly on the path to the goal. The goal-base lane bias simulations results may be normalized over a range of results from multiple simulations of a scenario.
- default lane bias: Similar to above, but applies a bias to choose a particular lane for normal travel when not near navigation decision-points (e.g., with a lot of distance to go on a highway before an exit). Typically, this lane bias is to stay in the right-most lane. Default lane bias may be measured in units of lane-seconds, and may reflect how many lanes the host-vehicle 14 is from a chosen lane for normal travel, and how long the host vehicle 14 is in a lane other than the chosen lane for normal travel. The default lane bias simulations results may be normalized over a range of results from multiple simulations of a scenario.
- other vehicle reactions: This cost function is a penalty on the host vehicle's behavior for sharp reactions that non-host vehicles 16 have, e.g., if the host vehicle policy 46 pulls in front of a non-host vehicle 16 and requires the non-host vehicle 16 to perform a harsh stop to avoid a collision, this cost will be high. Minimizing this cost improves safety by avoiding reliance on the reflexes of other drivers. Note that because choosing a policy 46 is based on the variation between host vehicle policies 46 instead of absolute metric scores, this cost function can be normalized out if all policies 46 lead to harsh reactions, or if non-host vehicles 16 are reacting to something other than the actions of the host vehicle 14.

To combine the set of metrics computed for each rollout to find a score for each policy choice, the metric outcomes may be converted to normalized, unit-less values, weights may be determined for each metric, and a weighted sum of metrics may be computed for each sampled outcome. The metric scores themselves have widely varying units between them, so to make them comparable, they may be normalized using a range of metric outcomes (e.g., with three policies 46 that get the host vehicle 14 respectively 10, 20 and 30 meters closer to the goal, respectively, the results may be normalized over the range, which is 20 meters, to values ranging from 0 to 1, yielding normalized metric scores of 0.0, 0.5 and 1.0, respectively).

To avoid overreacting to small variations (e.g., two policies 46 get the host vehicle 14 10.0 and 10.1 meters closer to the goal because they do almost the same thing), weights may be computed that get set to zero when the range across a single metric is too low to be informative. The final weights for each metric are either zero for uninformative metrics or a pre-determined weight chosen by the designer. The final reward for each sampled rollout is a weighted sum of all the metrics.

To compute a score for each available policy option (where there are multiple sampled outcomes for each choice), a weighted sum of the rewards may be computed for each sample involved with a particular policy choice, with weights given by the probability of each sample. The policy 46 may then be selected with the highest expected reward.

Exemplary Process Flow

FIG. 4 is a diagram of an exemplary process 400 for controlling a vehicle using multipolicy decision-making. The process 400 starts in a block 405.

In the block 405, a host vehicle 14 computer 20 receives data representing a current environment in which the host vehicle 14 is currently operating. For example, the computer 20 may receive (or retrieve) map data describing the current road network where the host vehicle 14 is operating. The computer 20 may further receive data regarding one or more non-host vehicles 16 travelling within a predefined distance to the host vehicle 14. The data may include the current position of each non-host vehicle 16, and other data such as speed, direction of travel etc. as described above. Further, the computer 20 may receive data of other objects within the predefined distance to the host vehicle 14, traffic signals, weather conditions, etc. Upon receiving the data describing the current environment, the process 400 continues in a block 410.

In the block 410, the computer 20 identifies a traffic environment 10 including the host vehicle 14 and one or more non-host vehicles 16 within the predefined distance to the host vehicle 14 as described above. The traffic environment 10 may be defined to include other elements in the environment, i.e., a road map, objects, etc. that may impact selection of a policy for driving the host vehicle 14. The process 400 continues in a block 415.

In the block 415, the computer 20 collects behavioral data representing behaviors of each of the non-host vehicles 16 in the recent past. As described above the behavior data may include the pose of the non-host vehicle 16 as a function of time, a speed of the non-host vehicle 16 as a function of time, a direction of travel, a number and magnitude of changes in direction and speed at various time points, etc.

Further as described above, the history of driving behaviors may be sampled e.g., every 0.3 s, with a maximum allowed number of history points. The maximum allowed number of history points may be, e.g., 400, which may show the previous two minutes of driving behavior for each non-host vehicle 16. The maximum allowed number of history points may depend on the type of driving situation currently be considered. For example, fewer history points may be necessary for a parking maneuver than for driving on a highway. After the computer 20 has collected the behavior data, the process 400 continues in a block 420.

In the block 420, as described in detail above, the computer 20 analyzes the past behavior of the non-host vehicles 16 using Bayesian change-point analysis. Based on the change-point analysis, the computer 20 identifies a distribution of likely policies 46 for each of the non-host vehicles 16 at the current timestep. Then, the computer 20 identifies one or more policies 46 that may be used to govern the host vehicle 14. The process 400 continues in a block 425.

In the block 425, the computer 20 performs one or more forward simulations of the traffic environment 10. The computer 20 selects high likelihood samples from the distribution of likely policies 46 for each of the non-host vehicles 16 and also from the one or more policies 46 for the host vehicle 14. Multiple simulations are run based on different sets of selected policies 46 for the non-host vehicles 16 and host vehicles 14. The process 400 then continues in a block 430.

In the block 430, the computer 20 evaluates the results of the multiple simulations based on a set of rewards established for the traffic environment 10. The computer 20 selects a policy 46 to govern the host vehicle 46 in order to maximize the rewards for the traffic environment 10 as described above. The process 400 continues in a block 435.

In the block 435, the computer 20 sends the selected policy 46 to the vehicle control unit 34. The vehicle control unit 34, based at least in part on the policy 46, issues commands to one or more controllers 26 to control the driving behavior of the vehicle 14. The process continues in a block 440.

In the block 440, the computer 20 determines if the process 400 should continue. For example, if the host vehicle 14 continues to move, the process 400 may return the block 405 and reevaluate the definition of the traffic environment 10. If, on the other hand, the ignition of the host vehicle 14 is turned off, the vehicle 14 has stopped moving (is parked), or if there has been a traffic event such as a collision, the computer 20 may determine that the process 400 should end.

Conclusion

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising a computer programmed to:
    receive data about a current and historical trajectory of each of the one or more second vehicles;
    select from a set of three or more pre-defined policies, a set of potential policies for each second vehicle, each of the potential policies in each respective set of potential policies including a respective possible second vehicle trajectory and one or more rules for the respective second vehicle trajectory;
    identify a set of change points for each second vehicle's historical trajectory, wherein each change point specifies a location and a time along the respective second vehicle historical trajectory at which it is determined that the respective second vehicle changed from a first policy from the set of potential policies for the respective second vehicle to a second policy from the set of potential policies for the respective second vehicle;
    determine, for each segment between a respective, adjacent pair of change points along the respective historical trajectory for each second vehicle, a respective policy from the set of potential policies for the respective second vehicle that fits to the historical trajectory of the respective second vehicle;
    identify, based at least in part on the policy from the set of potential policies for each segment between the respective adjacent pair of change points that fits to the historical trajectory of each respective second vehicle, a distribution of probabilities for each second vehicle at a current time; each probability of each respective distribution of probabilities associated with one of the potential policies from the set of potential policies for the respective second vehicle;
    select a policy for the first vehicle from the set of three or more pre-defined policies, based at least in part on the respective distributions of probabilities at the current time for the respective one or more second vehicles; and
    control the vehicle via an instruction provided by the computer to a controller based on the selected policy for the first vehicle.

2. The system of claim 1, wherein the selected policy for the first vehicle further indicates one or more alternative trajectories, each of the alternative trajectories associated with potential policies of the one or more second vehicles.

3. The system of claim 1, wherein the computer is further programmed to:
    identify one or more candidate policies for the first vehicle;
    perform one or more forward simulations based at least in part on the one or more candidate policies for the first vehicle and the distribution of probabilities at the current time for each second vehicle, wherein selecting the policy for the first vehicle is further based in part on results of the one or more forward simulations.

4. The system of claim 3, further wherein performing each of the one or more forward simulations includes:
    selecting a sample policy for the first vehicle from the candidate policies;
    selecting a sample policy for each of the one or more second vehicles from the respective sets of potential policies for each of the respective second vehicles; and
    performing the forward simulation based on the selected sample policies for the first and one or more second vehicles.

5. The system of claim 4, wherein the computer is further programmed to:
    identify one or more rewards reflecting a desired result; wherein selecting the policy for the first vehicle is further based in part on the identified rewards.

6. The system of claim 5, wherein the computer is further programmed to:

compare a result of the one or more forward simulations with respect to each of the identified one or more rewards;

assign, based at least in part on the comparison, a weighted value to the result of the forward simulation with respect to each of the identified one or more rewards;

compute a sum of the weighted values of the result for each of the one or more forward simulations with respect to each of the identified one or more rewards; and identify a forward simulation from the one or more forward simulations with a highest sum, wherein selecting the policy for the first vehicle is based at least in part on the selected sample policy used for the first vehicle in the identified forward simulation.

7. The system of claim 1, wherein the computer is further programmed to:

determine, based on the data, that the behavior of one of the one or more second vehicles cannot be explained by any policy from the set of pre-defined policies.

8. The system of claim 1, wherein identifying the change points includes inferring a maximum a posteriori set of change points at which change points between policies have occurred, based on the set of three or more pre-defined policies.

9. The system of claim 1, wherein the computer is further programmed to:

identify, from the first vehicle, the one or more second vehicles within a specified distance of the first vehicle, wherein the specified distance is based at least in part on a current traffic environment of the first vehicle.

10. The system of claim 9, wherein selecting the set of potential policies for each second vehicle is based at least in part on the current traffic environment.

11. A method comprising:

receiving data about a current and historical trajectory of each of one or more second vehicles;

selecting, from a set of three or more pre-defined policies, a set of potential policies for each second vehicle, each of the potential policies in each respective set of potential policies including a respective possible second vehicle trajectory and one or more rules for the respective second vehicle trajectory;

identifying a set of change points for each second vehicle's historical trajectory, wherein each change point specifies a location and a time along the respective second vehicle historical trajectory at which it is determined that the respective second vehicle changed from a first policy from the set of potential policies for the respective second vehicle to a second policy from the set of potential policies for the respective second vehicle;

determining, for each segment between a respective, adjacent pair of change points along the respective historical trajectory for each second vehicle, a respective policy from the set of potential policies for the respective second vehicle that fits to the historical trajectory of the respective second vehicle;

identifying, based at least in part on the policy from the set of potential policies for each segment between the respective adjacent pair of change points that fits to the historical trajectory of each respective second vehicle, a distribution of probabilities for each second vehicle at a current time; each probability of each respective distribution of probabilities associated with one of the potential policies from the set of potential policies for the respective second vehicle;

selecting a policy for the first vehicle from the set of three or more pre-defined policies, based at least in part on the respective distributions of probabilities at the current time for the respective one or more second vehicles; and controlling the vehicle via an instruction provided by the computer to a controller based on the selected policy for the first vehicle.

12. The method of claim 11, wherein the selected policy for the first vehicle further indicates one or more alternative trajectories, each of the alternative trajectories associated with potential policies of the one or more second vehicles.

13. The method of claim 11, further comprising:

identifying one or more candidate policies for the first vehicle;

performing one or more forward simulations based at least in part on the one or more candidate policies for the first vehicle and the distribution of probabilities at the current time for each of the one or more second vehicles, wherein selecting the policy for the first vehicle is further based in part on results of the one or more forward simulations.

14. The method of claim 13, wherein performing each of the one or more forward simulations includes:

selecting a sample policy for the first vehicle from the candidate policies;

selecting a sample policy for each of the one or more second vehicles from the respective set of potential policies; and performing the forward simulation based on the selected sample policies for the first and one or more second vehicles.

15. The method of claim 14, further comprising:

identifying one or more rewards reflecting a desired result; wherein selecting the policy for the first vehicle is further based in part on the identified rewards.

16. The method of claim 15, further comprising:

comparing a result of the one or more forward simulations with respect to each of the identified one or more rewards;

assigning, based at least in part on the comparison, a weighted value to the result of the forward simulation with respect to each of the identified one or more rewards;

computing a sum of the weighted values of the result for each of the one or more forward simulations with respect to each of the identified one or more rewards; and identifying a forward simulation from the one or more forward simulations with a highest sum, wherein selecting the policy for the first vehicle is based at least in part on the selected sample policy used for the first vehicle in the identified forward simulation.

17. The method of claim 11, further comprising:

determining, based on the data, that the behavior of one of the one or more second vehicles cannot be explained by any policy from the set of pre-defined policies.

18. The method of claim 11, wherein identifying the change points includes inferring a maximum a posteriori set of change points at which change points between policies have occurred, based on the set of three or more pre-defined policies.

19. The method of claim 11, further comprising:

identifying, from the first vehicle, the one or more second vehicles within a specified distance of the first vehicle, wherein the specified distance is based at least in part on a current traffic environment of the first vehicle.

20. The method of claim 19, wherein selecting the set of potential policies for each second vehicle is based at least in part on the current traffic environment.

* * * * *